(12) United States Patent
Baker

(10) Patent No.: US 8,122,022 B1
(45) Date of Patent: Feb. 21, 2012

(54) ABBREVIATION DETECTION FOR COMMON SYNONYM GENERATION

(75) Inventor: Steven D. Baker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 481 days.

(21) Appl. No.: 12/187,162

(22) Filed: Aug. 6, 2008

Related U.S. Application Data

(60) Provisional application No. 60/955,128, filed on Aug. 10, 2007.

(51) Int. Cl.
*G06F 7/00* (2006.01)
*G06F 17/30* (2006.01)

(52) U.S. Cl. ........ 707/736; 707/748; 707/749; 707/755; 707/758

(58) Field of Classification Search ................. None
See application file for complete search history.

(56) References Cited

U.S. PATENT DOCUMENTS

| | | | |
|---|---|---|---|
| 5,261,091 A * | 11/1993 | Yuyama ............................. 1/1 |
| 5,331,556 A | 7/1994 | Black |
| 5,594,641 A | 1/1997 | Kaplan |
| 5,832,474 A | 11/1998 | Lopresti |
| 6,385,629 B1 * | 5/2002 | Sundaresan et al. .......... 715/235 |
| 6,438,543 B1 * | 8/2002 | Kazi et al. ............................. 1/1 |
| 6,466,901 B1 | 10/2002 | Loofbourrow |
| 6,671,670 B2 * | 12/2003 | Levin et al. .................... 704/270 |
| 7,155,427 B1 | 12/2006 | Prothia |
| 7,237,123 B2 * | 6/2007 | LeVine et al. ................. 713/193 |
| 7,254,773 B2 * | 8/2007 | Bates et al. .................... 715/256 |
| 7,747,598 B2 * | 6/2010 | Buron et al. ................... 707/705 |
| 2003/0061122 A1 | 3/2003 | Berkowitz |
| 2004/0181512 A1 * | 9/2004 | Burdick et al. .................... 707/3 |
| 2005/0114130 A1 * | 5/2005 | Java et al. ...................... 704/240 |
| 2006/0047637 A1 * | 3/2006 | Meyerzon et al. ................ 707/3 |
| 2006/0088276 A1 * | 4/2006 | Cho et al. ......................... 386/46 |
| 2007/0185846 A1 * | 8/2007 | Budzik et al. ..................... 707/3 |
| 2009/0006359 A1 * | 1/2009 | Liao ................................... 707/5 |

OTHER PUBLICATIONS

Y. Park, and R.J. Byrd, "Hybrid Text Mining for Finding Abbreviations and Their Definitions" Proceedings of the 2001 Conference on Empirical Methods in Natural Language Processing, Pittsburgh, PA, Jun. 2001: 126-133.*

The Gain of Failures: Using Side-Effects of Anaphora Resolution for Term Consistency Checks, by Galia Angelova et al., AIMSA'98, LNAI 1480, pp. 1-13, 1998.*

Office Action for related case (U.S. Appl. No. 11/582,767), mailed from USPTO on Sep. 15, 2008.

* cited by examiner

*Primary Examiner* — Jay Morrison
(74) *Attorney, Agent, or Firm* — Fish & Richardson P.C.

(57) ABSTRACT

One embodiment of the present invention provides a system for determining an abbreviation for a term. During operation, the system receives a candidate abbreviation for the term. If the term is a compound term comprised of a number of constituent terms, the system then determines if the candidate abbreviation is substantially equal to at least one of the constituent terms. If so, the system determines that the candidate abbreviation is not an abbreviation for the term.

21 Claims, 9 Drawing Sheets

| Test 410 | Score 420 | Base 430 | High 440 |
|---|---|---|---|
| frequently_alterable 450 | Ratio of pseudo-queries of a particular type that can be derived from both the original phrase and the synonym = (i)/TDQ | 0.01 | 0.015 |
| frequently_much_in_common 460 | Fraction of user queries for which an altered query has at least three search results in common with the original query = (iv)/(ii) | 0.6 | 0.85 |
| frequently_altered 470 | Fraction of user queries for which the original query is followed by the altered query within a user session = (v)/TDQ | 0.0005 | 0.0015 |
| high_altering_ratio 480 | Fraction of user queries for which the original query is followed by the altered query within a user session divided by the fraction of user queries for which the altered query is followed by the original query within a user session = (v)/(vi) | 1.0 | 3.0 |

FIG. 4

ABBREVIATION DETECTION FOR COMMON SYNONYM GENERATION

RELATED APPLICATION

This application hereby claims priority under 35 U.S.C. §119 to U.S. Provisional Patent Application No. 60/955,128 filed 10 Aug. 2007, entitled "Abbreviation Detection for Common Synonym," by inventor Steven D. Baker.

BACKGROUND

Embodiments of the present invention generally relate to the field of information retrieval, and more specifically to the task of identifying valid synonyms for query terms to facilitate retrieving documents which relate to the query terms.

The relentless growth of the Internet makes locating relevant information on the World Wide Web (the Web) an increasingly challenging task. While search engines can help users locate and retrieve a document of interest on the Web, users often fail to select effective query terms during the search. The problem of finding desired query results becomes increasingly challenging as the amount of information available on the Web continues to grow.

For example, a user may enter the query [Web hosting+fort wayne] when the city of Fort Wayne is usually referred to as Ft. Wayne. A user may also enter [free loops for flash movie] when most relevant pages use the term "music" rather than "loops" and the term "animation" rather than "movie." Thus, documents that satisfy a user's informational needs may use different terms than the specific query terms chosen by the user. This problem is further aggravated as the number of terms in a query increases. For queries longer than three or four terms, there is a strong likelihood that at least one of the terms is not the best term to describe the user's intended search. It is therefore desirable for a search engine to automatically modify and/or expand user queries to include synonyms for query terms, so that retrieved documents can better meet the user's informational needs.

This task has proven to be difficult. A simple approach is to use pre-constructed synonym information, for example, from a thesaurus or a structured lexical database. However, thesaurus-based systems have various problems, such as being costly to construct and being restricted to one language.

Accordingly, what is needed is a method and an apparatus for identifying potential synonyms without the above-described problems.

SUMMARY

One embodiment of the present invention provides a system for determining an abbreviation for a term. During operation, the system receives a candidate abbreviation for the term. If the term is a compound term comprised of a number of constituent terms, the system then determines if the candidate abbreviation is substantially equal to at least one of the constituent terms. If so, the system determines that the candidate abbreviation is not an abbreviation for the term.

In one variation of this embodiment, the system decompounds the term into the corresponding constituent terms prior to determining if the candidate abbreviation is substantially equal to at least one of the constituent terms.

In one variation of this embodiment, the system determines whether the candidate abbreviation is substantially equal to at least one of the constituent terms by receiving a list of candidate synonyms for the term, and for each candidate synonym in the list: (1) determining if the candidate synonym is comprised of multiple terms; (2) if so, determining if the candidate abbreviation is substantially equal to at least one of the terms that comprise the candidate synonym; and (3) if so, determining that the candidate abbreviation is substantially equal to at least one of the constituent terms.

In one variation of this embodiment, the system further determines whether the candidate abbreviation is substantially equal to at least one of the constituent terms by receiving a list of candidate synonyms for the term, and for each candidate synonym in the list: (1) concatenating the candidate abbreviation with the candidate synonym to produce a possible compound term; (2) determining if the possible compound term is substantially equal to the term; and (3) if so, determining that the candidate abbreviation is substantially equal to at least one of the constituent terms.

In a further variation of this embodiment, the system concatenates the candidate abbreviation with the candidate synonym by: placing the candidate abbreviation before the candidate synonym; or placing the candidate abbreviation after the candidate synonym.

In one variation of this embodiment, the system determines whether the candidate abbreviation is substantially equal to at least one of the constituent terms by considering lexical relationships between the candidate abbreviation and each of the constituent terms.

In one variation of this embodiment, the system determines that the candidate abbreviation is not synonymous with the term if the candidate abbreviation is not an abbreviation for the term.

BRIEF DESCRIPTION OF THE FIGURES

FIG. 4 presents a table illustrating several tests that may be used to evaluate the quality or strength of synonym candidates in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling, Ranking and Searching Processes

Figure 1:
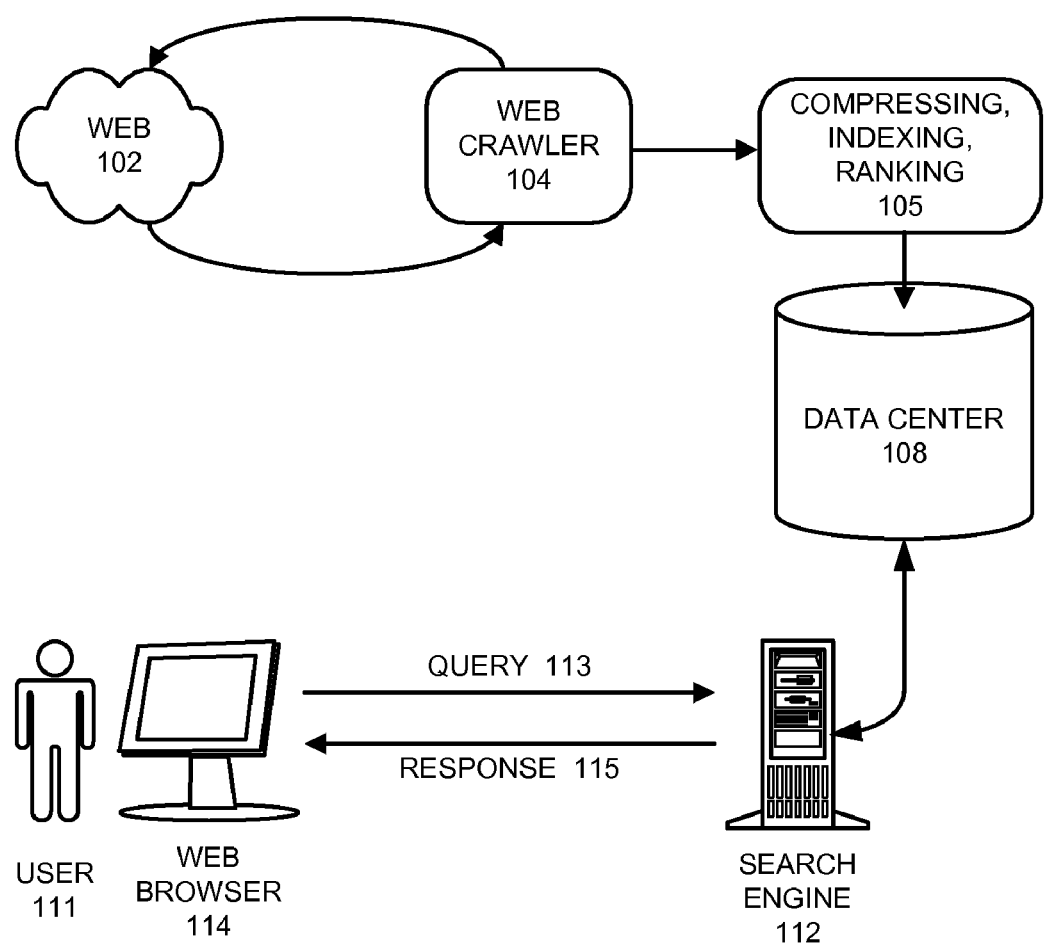
FIG. 1 illustrates the crawling, ranking, and searching processes in accordance with an embodiment of the present invention.

FIG. 1 illustrates the crawling, ranking and searching processes in accordance with an embodiment of the present invention. During the crawling process, a Web crawler 104 crawls or otherwise searches through websites on Web 102 to select Web pages to be stored in indexed form in data center 108. The selected Web pages are then compressed, indexed and ranked in module 105 (using the ranking process described above) before being stored in data center 108.

During a subsequent search process, a search engine 112 receives a query 113 from a user 111 through a Web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through Web browser 114, wherein the response 115 contains matching pages along with ranking information and references to the identified documents.

Note that some embodiments of the present invention do not require Web crawling. For example, the techniques described herein can also work with other document search and retrieval systems based on manually-controlled system such as human-maintained Web portals, directories, and paid inclusion.

Synonyms

Figure 2A:
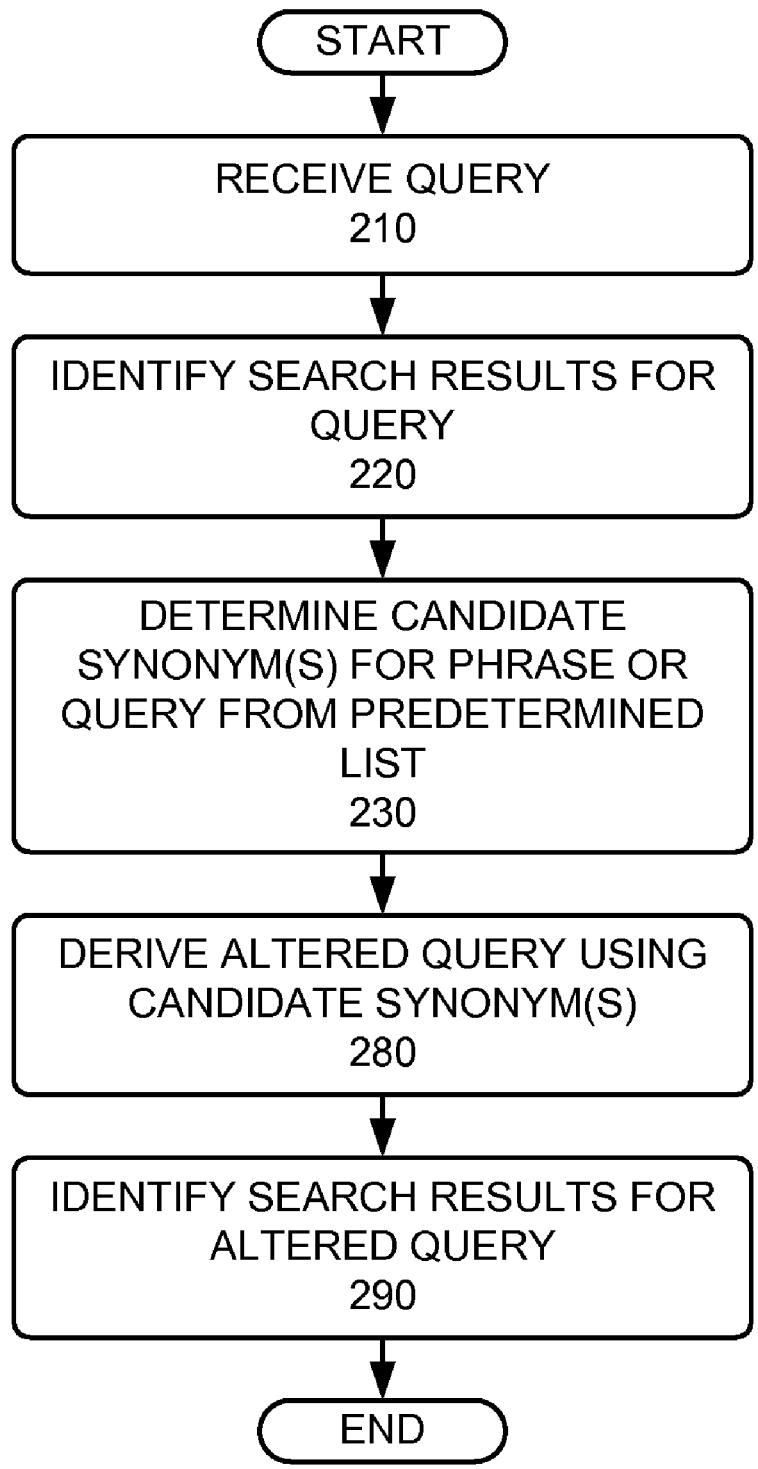
FIG. 2A presents a flowchart illustrating a method for producing altered queries in accordance with one embodiment of the present invention.

FIG. 2A is a flowchart illustrating a method for altering queries to incorporate synonyms in accordance with an embodiment of the present invention. After receiving a search query from a client, a front-end server provides the query to the search engine, which evaluates the query (operation 210). The front-end server and/or search engine can maintain log files or lookup tables for storing each received query and other information. For example, each query can be stored with a user identifier that identifies the browser and/or computer used by the user, a timestamp, and a list of some search results, such as the top ten document IDs that correspond to the search. Other information related to user context or the search itself may also be stored.

Next, a list of search results for the search query is identified (operation 220). The search engine then evaluates the query to retrieve a set of search results for the search query and returns the results to the front-end server. During this process, the search engine communicates with one or more content servers to select documents relevant to the search query. Typically, a content server stores a large number of indexed documents, which are indexed and/or retrieved from different websites. Alternatively, or in addition, the content server can store an index of documents stored on various websites. "Documents" are understood here to be any form of indexable content, including textual documents, images, video, audio, multimedia, presentations, and so forth.

In one embodiment, each indexed document is assigned a page rank according to the document's link structure. This page rank serves as a query-independent measure of the document's importance. An exemplary form of page rank is described in U.S. Pat. No. 6,285,999, which is incorporated by reference herein. The search engine assigns a score to each document based on the document's page rank (and/or other query-independent measure of the document's importance), as well as one or more query-dependent signals of the document's importance (e.g., the location and frequency of search terms in the document).

Figure 2B:
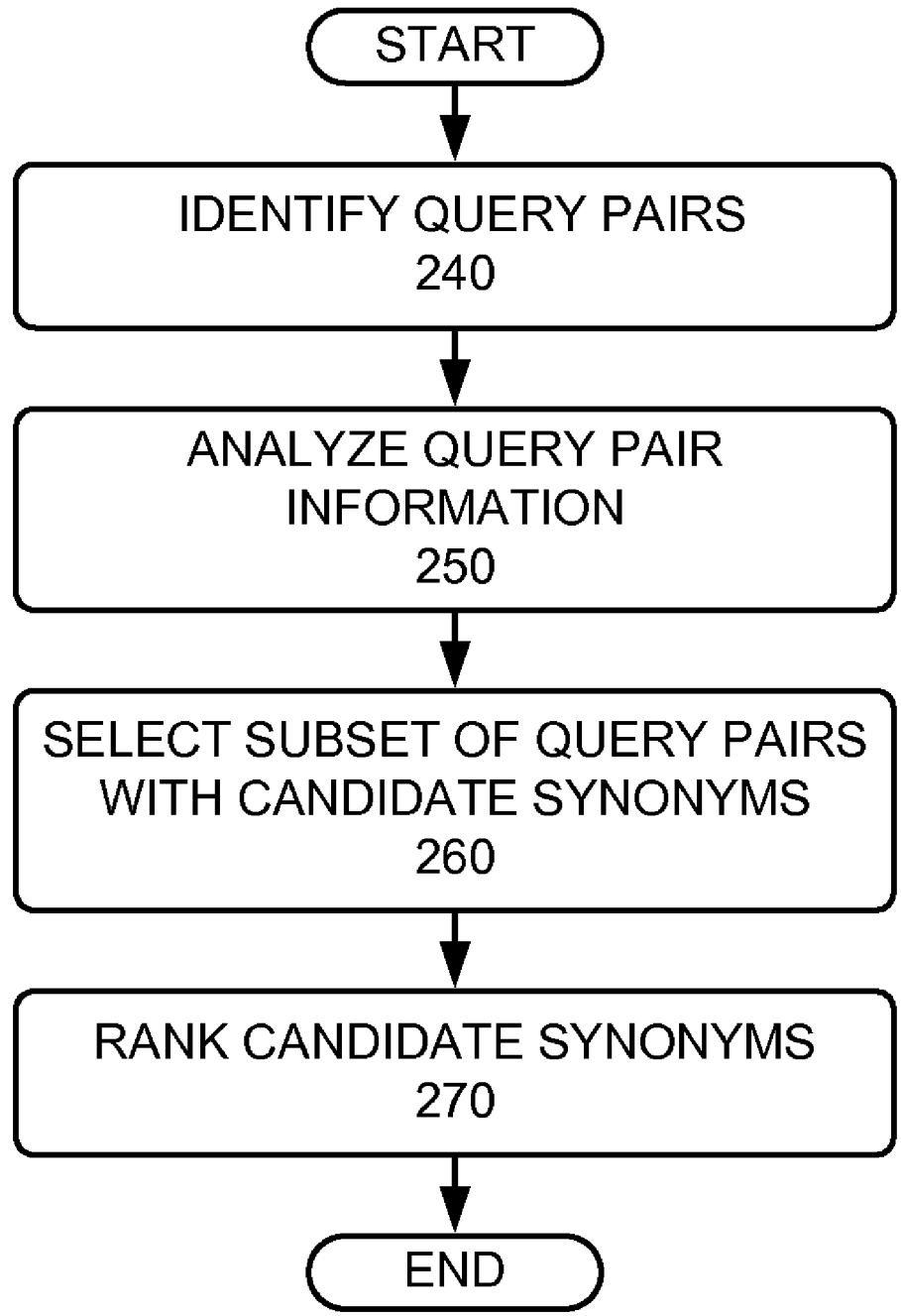
FIG. 2B presents a flowchart illustrating a process for determining one or more synonymous terms in the context of a query in accordance with one embodiment of the present invention.

Then, one or more synonymous terms associated with a context of the search query are identified based on a predetermined list (operation 230). Formation of the predetermined list may be accomplished using various processes. More specifically, FIG. 2B is a flowchart illustrating a process for determining one or more synonymous terms in the context of a search query according to one embodiment of the present invention.

First, query pairs are identified (operation 240). (An example of this process is further described in conjunction with FIG. 3 below.) In one embodiment, this is accomplished by analyzing user query logs and lookup tables. The set of all queries received over some period are reviewed and all original and altered query pairs are identified. An altered query is a query obtained by replacing a phrase in the original query with a candidate synonym. A "phrase," in the context of the present invention, is one or more individual words or terms.

For example, an original query might be [free loops for flash movie], and the altered query might be [free music for flash movie]. In addition, certain queries may be eliminated as having insufficient context. For example, queries used in the analysis may be required to have at least three terms. To facilitate identification of query pairs, possible query fragments, or "pseudo-queries," are formed by removing phrases from the query and replacing each phrase with a token (e.g., ":") that acts as a variable. Then, queries that vary only by the phrase marked with the token are identified as query pairs.

Next, information about the query pairs is analyzed (operation 250). For each query pair, additional information to suggest that the phrase in the original query and altered query are synonymous is identified. For example, the evidence may include the frequency with which both queries in the pair are entered by the same user within a short time interval, or the number of top results that the original query and altered query share.

To further ensure that candidates are effectively synonymous, one or more additional tests can be used. One such test is to determine whether for every query containing a phrase A, a corresponding altered query with a phrase B substituted for A has a moderately high probability of occurrence in the stored data. In one embodiment of the present invention, the required probability is 1%.

A second test is that, for every query containing A, the corresponding query with B substituted for A has a minimum probability of being entered by the same user in a short time interval. In one embodiment, the interval is an hour and the probability is 0.1% or greater.

A third test is that, for every query containing A, if the corresponding query with B substituted for A occurs, the two queries have a minimum probability of having a number of the top results in common. In one embodiment, the probability is 60-70% and the number of results in common is 1-3. These tests are described further in conjunction with FIG. 4.

Note that additional tests can be performed to determine the confidence level of a query candidate. Additionally, the system can perform a combination of these tests and assign a different weight to each test to compute an overall confidence level of the efficacy of a query candidate.

These tests can also be performed for subsets of query pairs in which the phrases appear in a particular context of adjacent words. For example, in the query pair [killer whale free photos] and [killer whale download photos], the candidate synonym pair "free" "download" appears in the context of following "whale," which can be indicated as (whale :), in the context of preceding "photos," which can be indicated as (: photos), in the context of between "whale" and "photos," which can be indicated as (whale: photos) and in the general context, which can be indicated as the token alone (:).

For each phrase, such as "free" above, and for each candidate synonym, such as "download" above, the statistics used for the above tests can be gathered for each of the most common contexts in which the phrase occurs. In this example, the query would be reflected in statistics for all occurrences of "free" in the general context (:); for only occurrences of "free" following "whale" in the context (whale :); for only occurrences of "free" preceding "photos" in the context (: photos); and for only occurrences of "free" between "whale" and "photos" in the context (whale: photos). Because many queries containing the phrase "free" are processed, statistics will be obtained for many contexts in which "free" has occurred, quite possibly many thousands of different contexts.

For each phrase such as "free" above, and for each candidate synonym, such as "download" above, the above tests are performed for the overall context, to determine whether the substitution is generally a good one. For example, it may be determined that "download" is not a good synonym for "free" in the general context, is a good synonym in the context (: photos), and is not a good synonym in the context (: press). The conclusion in this example is that the context (: photos) is an exception to the general rule that "download" is not a good synonym for "free."

From the query pairs, a subset is selected (operation 260) including phrases with candidate synonyms that meet certain criteria. In one embodiment, the criteria are some or all of the tests discussed above in the general context. In another embodiment, a number of top candidate synonyms are selected for the subset of query pairs. A synonym can be considered more significant than other synonyms, for example, if it is used in an altered query more often within user sessions, or if its altered query yields more search results in common with the original query.

Next, candidate synonyms are ranked (operation 270), or qualified, using the criteria discussed above. Initially, the system applies a set of threshold conditions, using the data gathered above as is discussed in greater detail in conjunction with FIG. 4. In one embodiment, the conditions may specify that, for at least 65% of the original-altered query pairs, there is at least one search result in common and that the frequency with which the altered query follows (e.g., occurs within five sequential queries) the original query within a user session is at least 1 in 2000. Then, the statistics from operation 250 are evaluated using a float scale function to determine a score for each qualified synonym, as discussed in greater detail in conjunction with FIG. 3. This score is a measure of the confidence in a qualified synonym. Depending on the application, greater or lesser confidence or strength will be required. Consequently, whether a qualified synonym is declared a useful synonym depends on the threshold value of evidence that is sufficient for the application.

Referring again to FIG. 2A, following identification in operation 230 of synonymous terms, one or more altered queries are derived (operation 280). Various methods exist for deriving alternative queries from the synonymous terms. One such method is disclosed in U.S. patent application Ser. No. 10/629,479, filed on Jul. 28, 2003, entitled "System and Method for Providing a User Interface with Search Query Broadening," which is incorporated herein by reference. In one embodiment, alternative queries are suggested that include the synonym, either as a substitution in or an addition to the query. In another embodiment, when a user enters a given query, a number of alternative queries can be provided to the user, along with the search results for the original query according to various methods.

In one embodiment, the synonym is treated as equivalent to the original phrase automatically for purposes of document retrieval. For example, the original query can be modified by replacing the phrase with a synonym or a disjunction of the original phrase and a synonym when producing search results for the query.

Based on the results obtained in the above operations, a list of altered search results for the altered query is identified (operation 290). In one embodiment, this list may include a maximum number of results.

Figure 3:
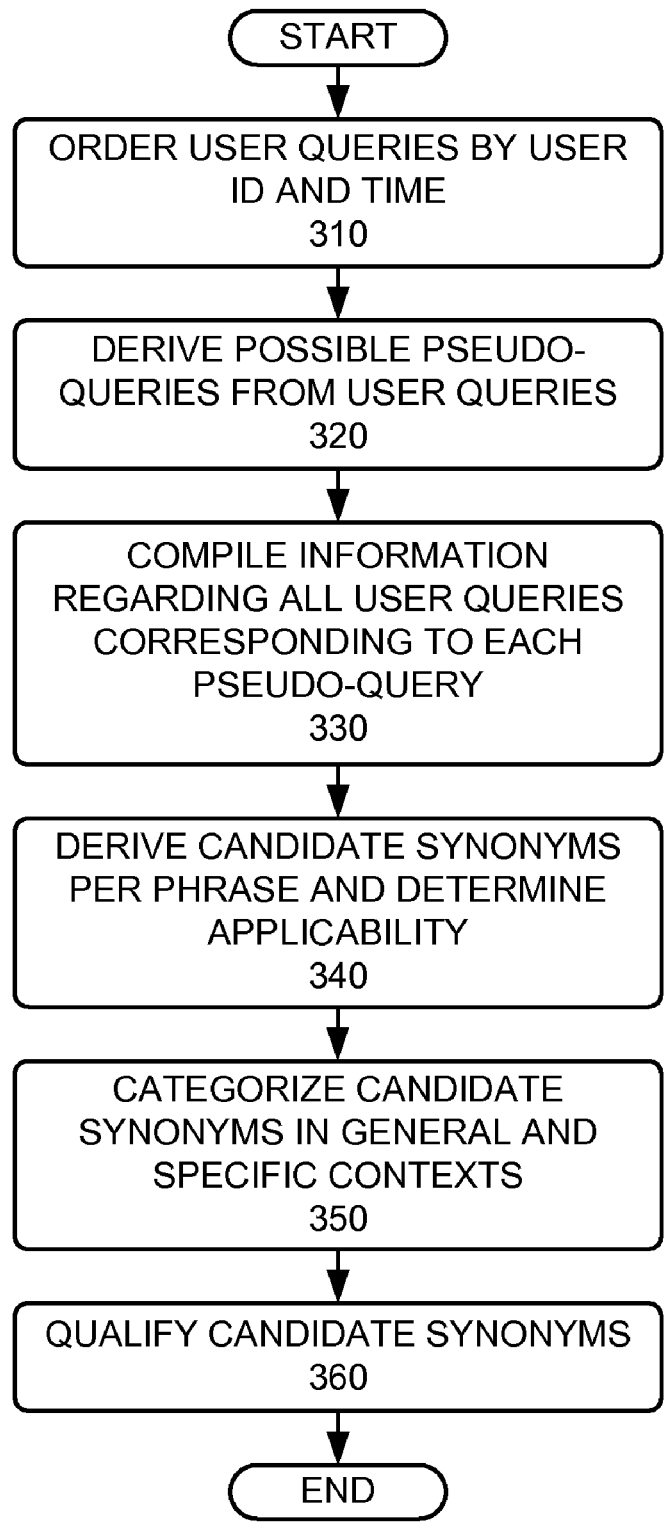
FIG. 3 illustrates an exemplary method for determining candidate synonyms for search query terms in accordance with one embodiment of the present invention.

FIG. 3 depicts an exemplary method for determining candidate synonyms for search query terms according to one embodiment of the invention. In one embodiment, the system sorts all queries received over a period of time, such as a week, by user ID (e.g., by cookie) and then by time (operation 310). This operation organizes the queries into individual user sessions, where a session is defined as queries from an individual client device (or user) occurring within a given time interval, for example one hour (though longer or shorter definitions of a session may be used, as desired). Assume that within a one-hour window from one user, the following queries were logged from an individual client device:

[gm cars]
[gm new car prices]
[gm used car prices]
[general motors used car prices]

The system first eliminates certain queries as having insufficient context. In one embodiment, queries used in the analysis have at least three terms. Thus, in the foregoing example, the query [gm cars] is eliminated.

For each remaining query, all possible query fragments, or pseudo-queries, are formed by replacing a sequence of one or more terms with a marker or token (e.g., ":"), while leaving at least two words in the pseudo-queries (operation 320). For the query [gm used car prices], the pseudo-queries are:

[: used car prices]
[gm : car prices]
[gm used : prices]
[gm used car :]
[: car prices]
[gm : prices]
[gm used :]

The generation of pseudo-queries may be described as iteratively replacing each term (or sequence of consecutive terms) of a query with a universal token. The term (or sequence of terms) that is replaced is called a "phrase."

Records are created for each pseudo-query of each query in session, which will be used to collect contextual information for the pseudo-queries, derive statistical information about term substitution, usage, and search result commonality (operation 330). Each pseudo-query record is keyed by its pseudo-query, the original query from which it was derived, and the phrase that was replaced by the token to produce the pseudo-query. The keying of the pseudo-query records in this manner allows for multiple different sorts and aggregations of the pseudo-query records as further described below. Operation 330 also optionally annotates a pseudo-query record with the first ten resultant document IDs (indicated below as "url#") returned by the search engine in response to the query, either extracted from the log files (if available), or indirectly with a pointer or other reference to an external store of the results. According to one embodiment, fewer or no document IDs may be annotated, to reduce the required storage space.

For the above example user session, one data record produced for [gm used car prices] would be
{pseudo-query: [gm : car prices],
   original_query: [gm used car prices],
   phrase: used,
   related_phrases: <{phrase: new, before: yes, after: no}>
   top_results: <url370293847, url123985709, . . . >
}

Another data record would be
{pseudo-query: [: used car prices],
   original_query: [gm used car prices],
   phrase: gm,
   related_phrases: <{phrase: general motors,
   before: no, after:yes}>
   top_results: <url370293847, url123985709, . . . >
}

Note that in these examples of pseudo-query records, the field delimiters (e.g., "pseudo-query:") are explicitly shown for illustrative purposes only, and in practice, would not necessarily be present in the actual records themselves. In addition, in these examples, "related phrases" are phrases that may be classified as candidate synonyms.

One of the data records produced for the query [gm new car prices] would have the same pseudo-query as the first record above:
{pseudo-query: [gm: car prices],
   original_query: [gm new car prices],
   phrase: new,
   related_phrases: <{phrase: used, before: no, after: yes}>
   top_results: <url123985709, url093475987, . . . >
}

Similarly, one of the data records produced for the query [general motors used car prices] would have the same pseudo-query as the second record above:
{pseudo-query: [: used car prices],
   original_query: [general motors new car prices],
   phrase: general motors,
   related_phrases: <{phrase: gm, before: yes, after: no}>
   top_results: <url370293847, url123985709, . . . >
}

Generating pseudo-queries operates specifies the range of potential contexts of each phrase implicit within each query. The records corresponding to an individual pseudo-query reflect what is known (i.e., across all user queries in the logs) about one set of queries that differ in only one phrase.

The system then analyzes records for each pseudo-query to generate a new set of records that reflect how well each phrase can function as a synonym for some other phrase, if it occurs in the given pseudo-query (operation 340). Pseudo-query records are sorted by pseudo-query such that all records with the same pseudo-query are grouped together. For example, assume that the records for the pseudo-query [: used car prices] include the two examples from above, plus two more, all of which are shown below:
{pseudo-query: [: used car prices],
   original_query: [gm used car prices],
   phrase: gm,
   related_phrases: <{phrase: general motors,
   before: no, after: yes}>
   top_results: <url370293847, url123985709, . . . >
}
{pseudo-query: [: used car prices],
   original_query: [general motors new car prices],
   phrase: general motors,
   related_phrases: <{phrase: gm, before: yes, after: no}>
   top_results: <url370293847, url123985709, . . . >
}
{pseudo-query: [: used car prices],
   original_query: [ford used car prices],
   phrase: ford,
   related_phrases: < >
   top_results: <url283923887, url739572390, . . . >
}
{pseudo-query: [: used car prices],
   original_query: [gm used car prices],
   phrase: gm,
   related_phrases: < >
   top_results: <url370293847, url123985709, . . . >
}

Thus, there is another query, [ford used car prices], as well as another instance of the query [gm used car prices] from elsewhere in the logs. Operation 340 generates a single record for each phrase that is identified in a pseudo-query. In other words, all records with the same pseudo-query are grouped together and a new record is created for each phrase covered by the group, reflecting how that phrase relates to the other phrases of the group for that pseudo-query. Continuing the present example, operation 340 creates a record for each of the phrases "gm," "general motors" and "ford." Each record includes candidate synonyms for the respective phrases.

In this example, each record output by operation 340 identifies the ten most significant potential synonyms for each phrase. The significance of synonyms is determined at this stage independently of context according to a hierarchy of tests. First, a synonym that occurs in more related queries within sessions is considered more significant than one that appears in fewer related queries. Second, if two synonyms occur in the same number of related queries within sessions (as is likely to be the case, because relatively few sessions have related queries), a synonym is considered more significant than another if the results returned for a search query that includes the first synonym have more results in common with the results returned for a query with the phrase. Finally, if two synonyms still evaluate as equally significant, one is considered more significant if it occurs more often within the queries corresponding to the respective pseudo-query.

As this example shows, even though a query may appear in several data records, as does [gm used car prices], the query is not weighted more heavily because it appears in more records. This aspect of the calculation is based on empirical evidence that it is more meaningful to examine many distinct queries than simply to count multiple occurrences of a given query.

Continuing with the present example, for the phrase "gm" and the pseudo-query [: used car prices], operation 340 would output:
{phrase: gm,
   original_query: [gm used car prices],
   related_phrases: <{phrase: general motors, common_urls: 5,
   before: no, after: yes},
{phrase: ford, common_urls: 0, before:no, after: no}>
}

As illustrated, operation 340 passes on the session information from operation 330. For example, the data record above reflects the session queries "gm used car prices," "general motors used car prices," and "ford used car prices." In many cases, like "ford" in this example, the original and altered queries may occur in different sessions, yet not occur together in a single session. Operation 340 also compares the search results (using, e.g., the document IDs) for each original and altered query if they were recorded, and tracks how many were in common. Thus, in the present example, [gm used car prices] and [general motors used car prices] had 5 documents in common among their respective top ten, while the results for [gm used car prices] had no documents in common with those for [ford used car prices]. Then, the records produced by this operation are sorted by phrase, gathering together all records produced by operation 340 for each phrase.

For each phrase, operation 350 computes statistics that reflect how well each candidate synonym functions as a synonym in general (i.e., in the general context, ":"), as well as in specific contexts. In the examples at this level of the analysis, candidate synonyms are selected from the observed "related phrases." Continuing the present example, assume that for the phrase "gm," operation 350 receives the above record, plus two more:
{phrase: gm,
　original_query: [gm used car prices],
　related_phrases: <{phrase: general motors, common_urls: 5, before:no, after: yes},
　{phrase: ford, common_urls: 0, before:no, after: no}>
}
{phrase: gm,
　original_query: [gm new car prices],
　related_phrases: <{phrase: general motors, common_urls: 4
　before:no, after: no},
　{phrase: 2005, common_urls: 0, before:no, after: no},
　{phrase: best, common_urls: 1, before:no, after: no}>
}
{phrase: gm,
　original_query: [nutrition of gm food],
　related_phrases: <{phrase: genetically modified, common_urls: 6,
　before: no, after: yes},
　{phrase: macdonalds, common_urls: 0, before: no, after: no}>
}

Operation 350 determines how many queries contained a particular phrase and computes statistics for each candidate synonym of the phrase. In one embodiment, this operation includes determining the number of queries for which the corresponding query with the synonym:
  (i) existed (i.e., appeared in the logs);
  (ii) existed and there was result data for both the original and altered queries, so that common results were computed;
  (iii) existed and had at least 3 results in common;
  (iv) existed and had at least 1 result in common;
  (v) appeared earlier within a session; and
  (vi) appeared later within a session.

Note that in the above operation the quantitative thresholds are for illustration purposes only. Other values of these thresholds can also be used.

In this example, for the phrase "gm" and the candidate synonym "general motors," the statistical data is:

(i) existed (i.e., appeared in the logs): 2;
  (ii) existed and there was result data for both the original and altered queries, so that common results were computed: 2;
  (iii) existed and had at least 3 results in common: 2;
  (iv) existed and had at least 1 result in common: 2;
  (v) appeared earlier within a session: 0; and
  (vi) appeared later within a session: 1.

This data suggests that "general motors" is a good synonym for "gm," although, in practice, statistics may be gathered over at least 1000 queries including the phrase "gm" in order to have sufficient confidence in the statistics.

In addition to evaluating these statistics for each synonym in the general context, operation 350 also gathers statistics for each context in which the phrase occurs frequently. For example, statistics can be gathered for the 10,000 contexts for which the most queries exist. In this example, the contexts would be (:), (: used), (: used car), (: new), (: new car), (of :), (nutrition of :), (: food), and (of : food). Only one of the queries discussed in the above example (original queries [gm used car prices], [gm new car prices], and [nutrition of gm food]) belongs to each of these specialized contexts, except the general context, (:), which subsumes all three queries. Realistically, however, some contexts will include data from many queries. Operation 350 evaluates the above statistics for each context, retaining, for each context, only the 20 most common candidate synonyms.

Operation 360 further qualifies candidate synonyms using various tests. FIG. 4 is a table illustrating several tests that may be used to quantify the quality or strength or confidence of a candidate synonym according to one embodiment of the present invention. The tests 410 apply to statistics gathered in operation 350.

The process begins by confirming that two preliminary conditions are satisfied. The first preliminary condition is that for at least 65% of the original-altered query pairs, there is at least one search result (e.g., a URL) in common. The 65% parameter is empirically derived, and other thresholds can be used as well, depending on the corpus of documents. The second preliminary condition is that for at least 1 in 2000 of the query pairs, a user in a session enters the original query followed by the altered query within, e.g., five queries. The threshold values used in this particular embodiment are also for illustrative purposes only, and other values can be used as well.

If both preliminary conditions are satisfied, operation 360 evaluates a number of the statistics from operation 350 as a group and accords weight to each statistic. The evaluation can be based on the following function Scale( ):
　float Scale(float score, float base, float high) {
　float x=(score−base)/(high−base);
　float y=(x−sqrt(x*x+4.0))/2.0;
　return 1.0+y;
　}
where score 420 (ratio the test determines), base 430 (target value), and high 440 (scaling factor) are taken from the tests 410 of FIG. 4, which are described in greater detail below.

A series of tests 410 shown in FIG. 4 that apply function Scale( ) to the data evaluated in operation 350. Scale( ) is defined such that the value returned is 0 when score=base, asymptotically approaches 1 when score 420 is a large positive value, and is equal to (score−base)/(high−base) when score 420 is large negative. The value of base 430 reflects a desired value for the given test. The individual tests are defined as follows.

frequently_alterable 450 provides a measure of whether, for each query with the phrase of interest, the corresponding altered query occurs frequently enough (preferably more than 1%) to suggest that the candidate synonym makes sense in context. The result of this test is computed as the result (i) from operation 350 (queries in log) over the total number of distinct queries including the phrase (TDQ).

frequently_much_in_common 460 evaluates whether the original queries and altered queries typically exhibit enough results in common to suggest that the meanings of the phrase and candidate synonym are similar. Preferably, at least 60% of altered queries have at least 3 search results in common with the original user query. The result of this test is computed as result (iv) from operation 350 (had at least one result in common) over result (ii) of operation 350 (result data existed for both original and altered queries).

frequently_altered 470 evaluates whether users occasionally try the substitution. Preferably, for every 2000 user queries, there is a corresponding altered query within the same session. The result of this test is computed as result (v) from operation 350 (appeared earlier within a session) over TDQ.

high_altering_ratio 480 measures whether users do not preferentially substitute in the opposite direction, i.e., substitute the phrase for the candidate synonym, which would suggest that the original phrase is much better than the candidate synonym. Preferably, for every user session in which the altered query is followed by the user query, there is at least one session in which the user query is followed by the altered query within a user session. The result of this test is computed as result (v) from operation 350 (appeared earlier within a session) over result (vi) from operation 350 (appeared later within a session).

The following parameters are then computed based on the above test results:
soft_and=frequently_alterable+2*frequently_much_in_common+0.5*frequently_altered+high_altering_ratio;
evidence=1.0−exp(−soft_and/1.5),
where exp( ) is the natural exponential function, and soft_and reflects the totality of the test metrics. The above formula is only one possible embodiment of the present invention. Other formulae are also possible for computing the confidence level of a synonym candidate.

The value of evidence is a measure of the strength of or confidence in a synonym. An evidence value approaching 1.0 indicates very high confidence, while a value of 0.6 reflects good confidence. Depending on the application, greater or lesser confidence or strength can be required. Consequently, whether a candidate synonym is declared a validated synonym depends on the threshold value of evidence that is sufficient for the application. It has been empirically determined that for many applications, for example, a candidate synonym can be validated, e.g., considered equivalent to a phrase, if the value of evidence is greater than 0.6. Again, other thresholds and variations of the Scale function, and its subordinate functions may also be used.

A set of validated synonyms and the corresponding contexts in which they are effective can be utilized in several ways. A conservative approach is to suggest to the user alternative queries into which the synonym has been substituted. For example, when a user enters a given query, a number of alternative queries can be provided to the user, along with the search results for the original query. Each of the alternative queries can be linked to its associated search results, so that the user does not have to manually re-enter the alternative query.

A more aggressive approach automatically treats the synonym as equivalent to the original phrase for purposes of document retrieval. This approach replaces a phrase with a disjunction of the latter and the synonyms. For example, "gm" would be replaced by "gm" or "general motors." Alternatively, if the evidence for a synonym is relatively weak, the synonym can be used as suggestive rather than equivalent;

An aspect of the present invention includes a computer-implemented method to determine synonyms to serve as substitutions for phrases within an information search query. Candidate substitutions may be suggested to the user or automatically included in addition to or in place of the original query. Alternatively, the candidate substitution may be used solely to modify the score associated with the retrieved documents. A formula may be used to assess the strength or quality of candidate synonyms, and the strength or quality may be compared to a threshold that is determined according to the application of interest.

Extensions

The preceding discussion describes a generalized technique for discovering and generating context-sensitive synonyms. This technique is very useful, but it does not take into account lexical relationships between words. Consequently, the above-described technique misses many useful stems and other lexically similar words.

The following discussion describes techniques which remedy this problem by considering special classes of highly trusted synonyms which are lexically related to the original word. The system treats these synonyms differently and is more inclusive of these synonyms in the data. These lexically related words can be categorized in various ways, but all share the trait of exhibiting a lexical connection between the original word and the synonym:

(1) synonyms that share the same stem as the original word, according to an industry-standard lexical stemming technique (e.g., car->cars);
(2) synonyms that differ from the original word according to punctuation or spacing differences (e.g., wood stock->woodstock, albertsons->albertson's);
(3) synonyms that are acronyms of the original word/phrase or vice versa. (e.g., VFW->veterans of foreign wars);
(4) synonyms that are similar according to a prefix-biased edit-distance technique;
(5) synonyms that are similar except for accenting on certain characters; and
(6) synonyms in which one word is an abbreviations of another word (hrs->hours).

The following section describes each of the above lexical relationships between synonyms in more detail, and provides exemplary techniques for detecting such lexical similarities between two words.

Detecting Lexical Similarity

Decompounding/Compounding

One technique for detecting synonyms that differ from the original word only by punctuation or spacing is to run through the original word and the synonym, and remove all punctuation and spaces (both defined according to an accepted standard of character sets, e.g., UTF8). The system then compares the results, and if they are equal, the synonym falls into this class. These types of synonyms tend to be prevalent in Germanic languages. An example in English is woodshed->"wood shed." Stripping out the spaces from both, we get "woodshed" and "woodshed" which are identical. An example of a punctuation difference is albertson's->albertsons. After punctuation removal, "albertson's" and "albertsons" become the same.

Acronym Synonyms

If one of the words is a single word, the system can run an edit-distance procedure to align the original word and the phrase. ("Edit distance" refers to the number of edits required to change one word to another word.) In one embodiment, if a substantial number or fraction of the characters in the single word align with the first letters of the phrase (or vice versa), the system detects this word as an acronym. In addition, the system collects the first characters of all the words in the phrase and runs the edit-distance procedure again against the single word. If they are sufficiently similar within a predetermined number of edits, the system deems the single word an acronym. In another embodiment, the system checks that all characters in the word align with the first character of each word in the phrase. For example, consider the acronym NASA->"National Aeronautic and Space Administration." The system extracts from the phrase "NAASA" and attempts to align that with "NASA." There would be one edit (the addition of an "A"). The maximum length of both strings is 5, hence 1/5=0.20, which is below 0.25, a predetermined edit-distance threshold. The edit-distance threshold does not need to be fixed, and could be set based on empirical measurements.

Pseudostems

Standard stemming as a conventional synonym-generation technique can often be overly conservative, because in the past it has been used to identify stems without the help of any additional signals. Embodiments of the present invention use standard stemming as just one signal in a system that produces high-quality synonyms and stems.

In particular, embodiments of the present invention use "pseudostemming," a technique that is more inclusive than conventional stemmers. During operation, if the original word and the candidate synonym differ by one edit, the system concludes that the candidate synonym is a pseudostem. Otherwise, the system uses a sequence of tests: First the system computes the length of the common prefix the two words share. In one embodiment of the present invention, the system determines whether the number of characters of the matching prefix divided by the maximum length of either string is greater than a given threshold. For example, for "shuttler" and "shuttling," the common prefix is "shuttl," with a length of six. The maximum length is nine; therefore, the ratio is 6/9, which is 0.67. An empirically determined threshold can be 0.5, hence this first test passes. Note that in one embodiment one edit is defined as one character change to make two corresponding characters in two terms identical. An "edit distance" is defined as the total number of edits required to make two terms identical.

After the first test, the system examines the leftover strings of both words after the common prefix, which in the above example would be "er" from "shuttler" and "ing" from "shuttling." The system calculates the edit distance between the leftover strings, which is an edit distance of three in this example (using a character mismatch cost of one).

In another embodiment, the system can also require this edit distance of the leftover strings to be less than a fraction of the maximum length of both strings. For example, the maximum length in the present example is nine, and a given fraction threshold is 0.4, hence the maximum edit distance for the strings to qualify as synonyms is 0.4*9=3.6. An edit distance of three is less than 3.6, hence in this case, the leftover edits would also pass this test. Because the two words in this example pass both tests, the system declares them to be pseudostems.

Diacriticals

In many non-English languages the use of diacritical marks and accents is fairly common. The system can remove these marks with both language-specific and universal de-accenting. If the words are substantially similar after accent removal, they classify as lexical variants. In addition to removing accents in the original words, the system can further input the deaccented words to any of the above techniques. This additional operation allows the system to capture the case where, for example, a character may be accented in the phrase for an acronym, but is not accented in the acronym itself. In one embodiment, comparing an accented to an unaccented character does not count as an edit in pseudo-stemming or other techniques.

Gender/Number Stemming Detection

In one embodiment, the system can use linguistic rules specific to each language and develop a classifier that detects a word to be a "conservative" stemming variant of another word.

Abbreviations

Many people use abbreviations or shorthand for words. For example, "hours" can be written as "hrs" or "people" as "ppl." In one embodiment, the system can detect abbreviations by removing vowels from both words and measure the edit distance. The system then determines whether the edit distance between the two shortened words is sufficiently small compared with the maximum length of both words. For example, removing the vowels from "hours" produces "hrs." The system computes the edit distance between "hrs" and "hrs," which is 0. The maximum length in this example is three characters, hence the ratio is 0/3, or 0.0. This ratio is less than an acceptable edit-distance threshold, which is empirically determined.

The above-listed techniques are not exhaustive. The system can use the above techniques in addition to standard stemming techniques to identify trusted lexical synonyms. In particular, the system can use the Lovins and Porter stemmers. Other stemmers can also be suitable replacements.

The following sections describe further techniques for detecting an abbreviation relationship between candidate synonymous words.

Improved Abbreviation Detection

One embodiment of the present invention provides a system that performs improved abbreviation detection. The previously described approach detects a term's abbreviation by removing the vowels from the term and comparing the remaining character string with a second, shorter term. This approach often results in mis-identifications or mis-disqualifications, because an abbreviation can sometimes contain vowels or omit consonants from the original term.

According to one embodiment, the system first determines which term is the shorter one. The system then compares the first character of the two terms, and determines whether the first characters are based on the same language symbol. Note that the system does not require an exact match between the first characters of the two terms. For example, an uppercase character "P" is considered to be a match to the corresponding lowercase character "p." In other cases, a character is considered to be a match to a corresponding character with a different accent. In general, if both term's first characters are based on the same language symbol, the system considers the two characters to be a match.

After matching the first characters, the system further iterates through every character in the shorter term to determine if there is a corresponding character in the longer term in the same order. For example, the system receives two terms, "people" and "PPL." The system first considers the first characters of both terms, and determines "P" to be a match to "p." The system then iterates through the rest of the remaining characters in the shorter term "PPL." After identifying the matching characters for both "P" and "L" in the longer term "people," the system determines that the order of the characters in the shorter term is preserved by the corresponding characters "p," "p," and "1" in the longer term. The system then reaches a conclusion that the two terms are synonyms.

Figure 5:
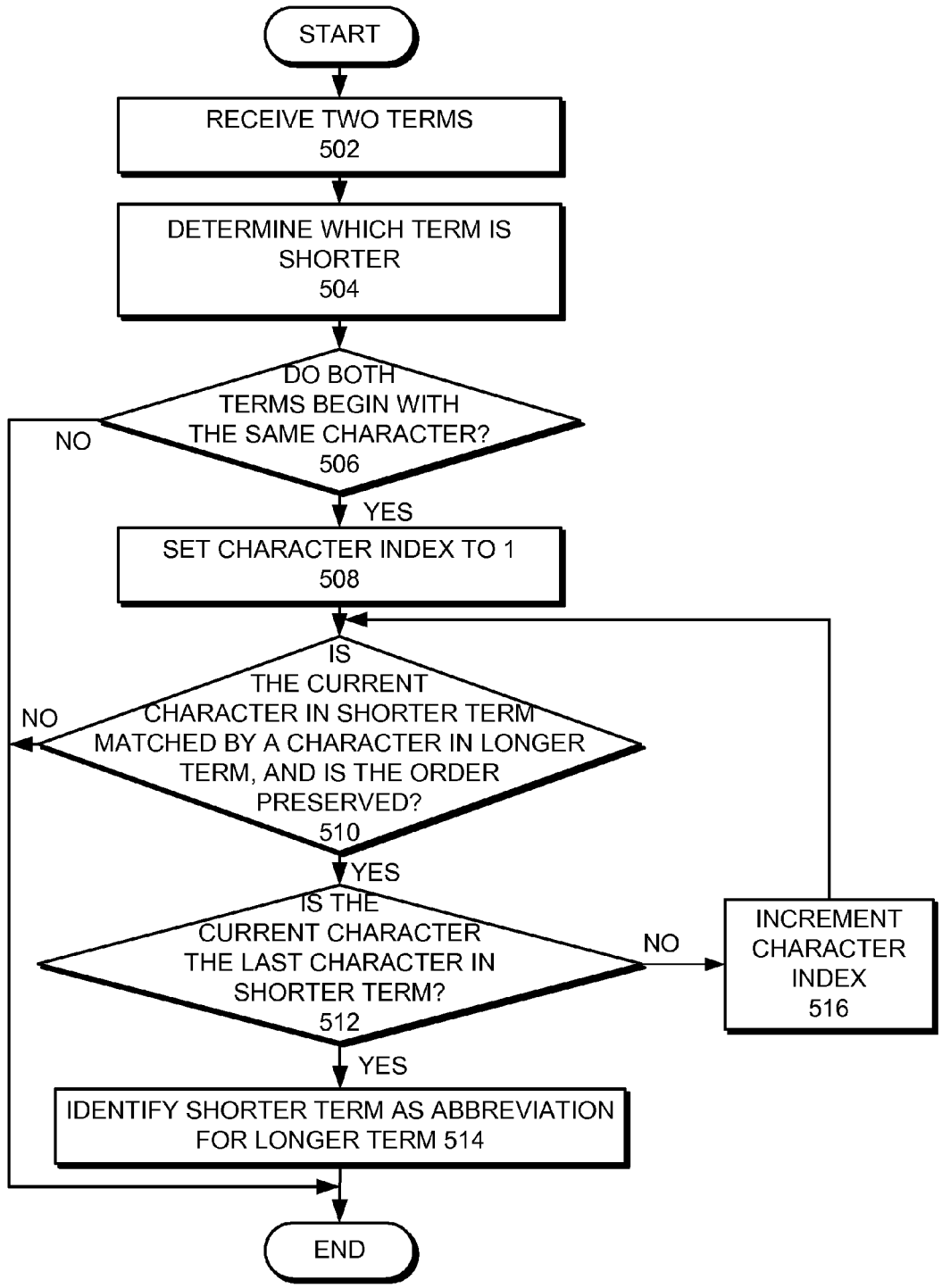
FIG. 5 presents a flowchart illustrating the process of detecting abbreviation in accordance with one embodiment of the present invention.

FIG. 5 presents a flow chart illustrating the process of detecting abbreviations in accordance with one embodiment of the present invention. During operation, the system receives two terms (operation 502). The system then determines which term is shorter (operation 504) and determines whether both terms begin with the same character (operation 506). If so, the system sets a character index for the shorter term to 1 in preparation for the iteration (operation 508). Otherwise, the system determines that the shorter term is not an abbreviation of the longer term and exits.

During iteration, the system determines whether the current character corresponding to the character index in the shorter term is matched by a character in the longer term, and whether the order of the shorter-term characters is preserved by the corresponding characters in the longer term (operation 510). If this condition is not met, the system determines that the shorter term is not an abbreviation of the longer term and exits. If this condition is met, the system further determines whether the current indexed character is the last character in the shorter term (operation 512). If so, the system identifies the shorter term as an abbreviation for the longer term (operation 514) and exits. Otherwise, the system increments the character index and proceeds to the next character in the shorter term (operation 516).

A Further Improved Abbreviation Detection

The abbreviation detection technique illustrated in FIG. 5 can detect abbreviations that are not real abbreviations in some special cases. In particular, such mis-identifications can occur when an original term is a compound term comprised of a number of constituent terms. For example, consider the compound term "breakfast" which is comprised of two constituent terms "break" and "fast." A candidate abbreviation "break" meets all criteria specified in FIG. 5 (i.e., it begins with the same character and preserves the ordering), and hence is identified as an abbreviation for "breakfast" by the technique illustrated in FIG. 5. Unfortunately, this is a false abbreviation. Note that in the above example, neither of the two constituents of the term "breakfast" is a valid abbreviation for "breakfast." Another example illustrating the same problem in the technique of FIG. 5 is the compound term "showtimes" and the corresponding candidate abbreviation "shows."

Note that this problem is not only limited to the English language, but can occur in many other languages, such as German or Dutch. In particular, Germanic languages include a large number of compound words which are formed by compounding multiple words. For example, in German, the term "feldmaus" means "field mouse" in English, which is comprised of the constituent terms "feld" and "maus." However, the term "feld" is not an abbreviation for the term "feldmaus," even though it meets the all the conditions specified in FIG. 5.

In one embodiment of the present invention, a system is configured to identify a candidate abbreviation as a "partial compound" of an original term (i.e., the longer term), wherein a partial compound of a compound term is defined as a term that is substantially equal to a constituent term in the compound term. For example, "break" is a partial compound of "breakfast" because "breakfast" is a compound term which includes the constituent "break." Similarly, "feld" is a partial compound of "feldmaus" because "feldmaus" is a compound term that contains the constituent "feld." Note that if a shorter term is a partial compound of a longer term, the short term is highly unlikely to be an abbreviation for the long term. We now describe how to use partial compound detection to improve the above-described abbreviation detection technique.

Figure 6:
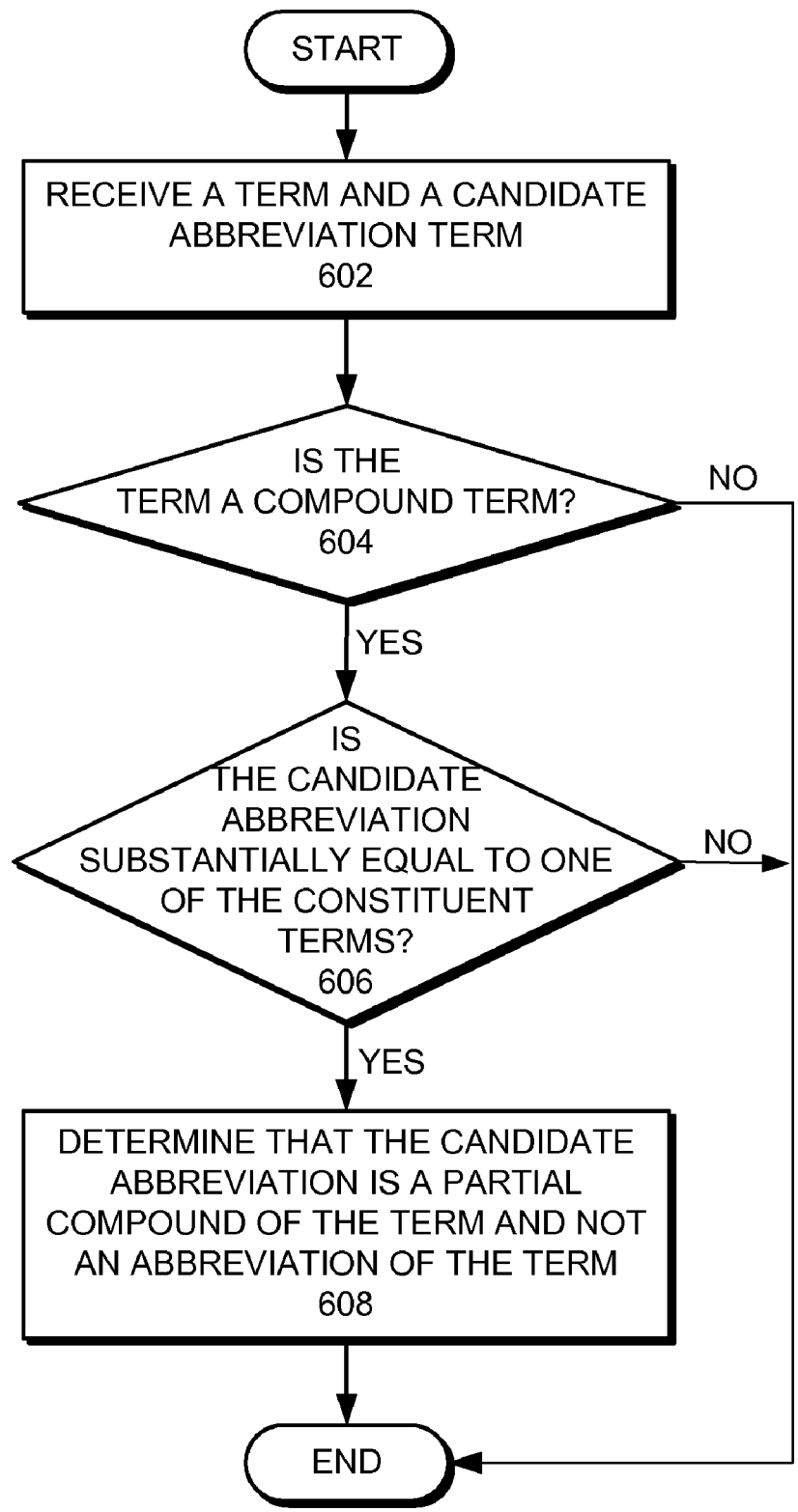
FIG. 6 presents a flowchart illustrating the process of determining an abbreviation for a term in accordance with an embodiment of the present invention.

FIG. 6 presents a flowchart illustrating the process of determining an abbreviation for a term in accordance with an embodiment of the present invention.

During operation, the system receives a term and a candidate abbreviation for the term (step 602). The system then determines whether the term is a compound term which is comprised of a number of constituent terms (step 604). In one embodiment of the present invention, the system determines if the term is a compound term by applying a "decompounding technique" to the term. Note that any decompounding technique now known or later developed can be used for this purpose. In a further embodiment of the present invention, if the system receives a term that is known to be a compound term, the system does not need to perform step 604.

If the term is a compound term, the system next determines whether the candidate abbreviation is substantially equal to at least one of the constituent terms that comprise the term (step 606). If so, the system determines that the candidate abbreviation is a partial compound of the term, and is therefore not an abbreviation for the term (step 608).

For example, given the terms "breakfast" and "break," the system determines that "break" matches the first constituent term in "breakfast." Therefore, "breakfast" and "break" are substantially equal, and hence "break" is a partial compound and not an abbreviation of "breakfast."

Note that the system does not require the candidate abbreviation to be exactly equal to a constituent of the compound term to be regarded as a partial compound. The candidate abbreviation only has to be "substantially equal" to the constituent. To determine substantial equality, one embodiment of the present invention considers possible lexical relationships between the candidate abbreviation and each constituent term. These lexical relationships can include, but are not limited to: sharing the same stem, differing in punctuation, spacing, and/or accents, and differing by a small edit-distance. For example, with an edit-distance of one, "likely" is substantially equal to "likeli," which is a constituent term in a compound term "likelihood." Consequently, the system determines that "likely" is a partial compound of "likelihood" and not an abbreviation of the term.

Figure 7A:
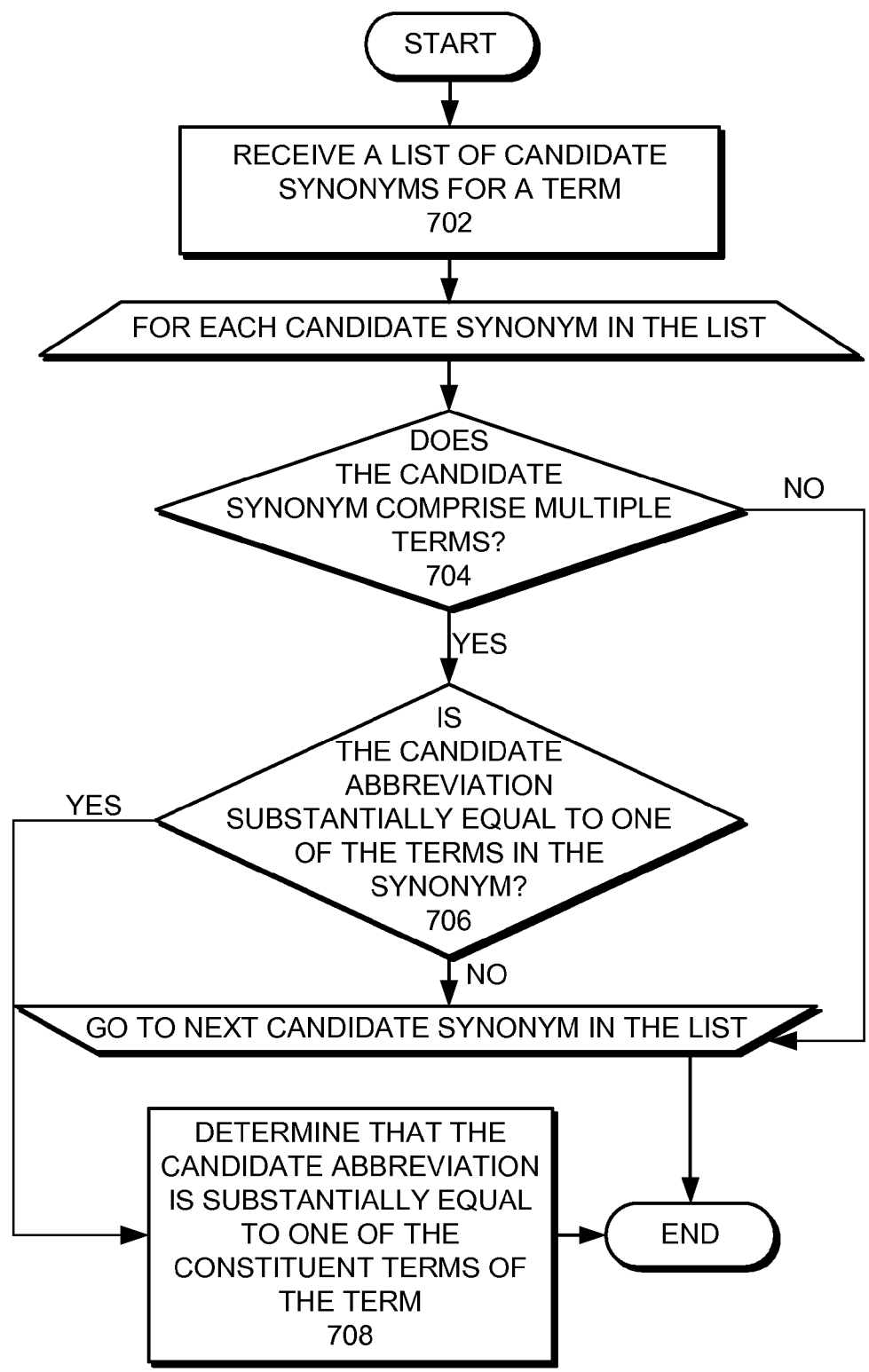
FIG. 7A presents a flowchart illustrating a process of determining whether the candidate abbreviation is substantially equal to a constituent term in accordance with an embodiment of the present invention.

FIG. 7A presents a flowchart illustrating the process of determining whether a candidate abbreviation is substantially equal to a constituent term in accordance with an embodiment of the present invention.

During operation, the system receives a list of candidate synonyms for the original term (step 702). In one embodiment, the list of candidate synonyms is produced by aforementioned candidate synonyms identification techniques. For example, the synonym list can include terms that are lexically related to the original term, such as terms that share the same stem, terms that differ from the original term in punctuation, spacing, and/or accents, and terms that are sufficiently similar according to an edit-distance.

Next, for each candidate synonym in the list, the system determines if the candidate synonym comprises multiple terms (step 704). If so, the system determines whether the candidate abbreviation is substantially equal to at least one of the terms that comprise the candidate synonym (step 706). If so, the system determines that the candidate abbreviation is substantially equal to at least one of the constituent terms in the term (step 708). If not, the system proceeds to examine the next candidate synonym in the list.

In one embodiment, while performing step 706, the system considers possible lexical relationships between the candidate abbreviation and a constituent term in the candidate synonym. These lexical relationships can include, but are not limited to: two terms sharing the same stem, two terms differing in punctuation or spacing, two terms differing in accents, and two terms which are sufficiently similar according to an edit-distance. For example, the compound term "broadcast" can have the candidate synonym "broad casting" in its synonym list. In this case, the system determines that the candidate abbreviation "cast" is a partial compound of "broadcast" because "cast" is substantially equal to the term "casting" in the candidate synonym "broad casting."

Note that when the system has positively identified a candidate synonym for the candidate abbreviation in step 706, the system can forgo examining the rest of the candidate synonyms in the list that have not been processed.

Figure 7B:
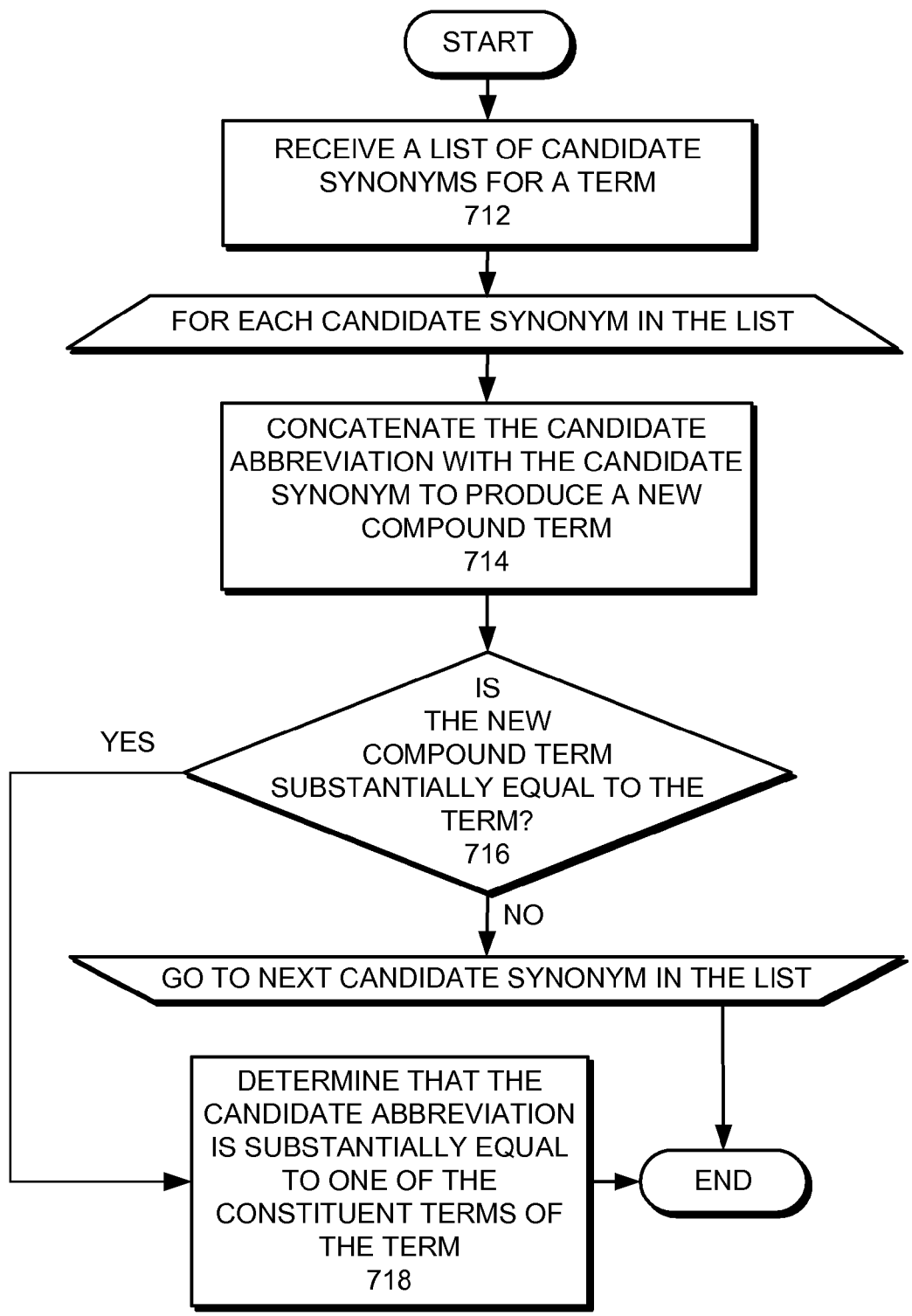
FIG. 7B presents a flowchart illustrating another process for determining whether the candidate abbreviation is substantially equal to a constituent term in accordance with an embodiment of the present invention.

FIG. 7B presents a flowchart illustrating another process for determining whether a candidate abbreviation is substantially equal to a constituent term in accordance with an embodiment of the present invention.

During operation, the system receives a list of candidate synonyms for the term (step 712). In one embodiment, the list of candidate synonyms is produced by aforementioned candidate synonyms identification techniques. For example, the synonym list can include terms that are lexically related to the original term, such as terms that share the same stem, terms that differ from the original term in punctuation, spacing, and/or accents, and terms that are sufficiently similar according to a predetermined edit-distance.

Next, for each candidate synonym in the list, the system concatenates the candidate abbreviation with the candidate synonym to produce a new compound term (step 714). In one embodiment, while concatenating the two terms, the system produces two new compound terms by either placing the candidate abbreviation before the candidate synonym or placing the candidate abbreviation after the candidate synonym. The system then determines if the new compound term is substantially equal to the original term (step 716). If so, the system determines that the candidate abbreviation is substantially equal to at least one of the constituent terms in the term (step 718).

In one embodiment, while performing step 716, the system considers lexical relationships between the new compound word and the original term. These lexical relationships can include, but are not limited to: two terms sharing the same stem, two terms differing in punctuation or spacing, two terms differing in accents, and two terms which are sufficiently similar according to an edit-distance. For example, consider the compound term "broadcast" which has a candidate abbreviation "broad" and a candidate synonym "cast." In this example, the system concatenates the terms "broad" and "cast" to form two new compound terms "broadcast" and "castbroad." The system subsequently compares the original term "broadcast" with each of the new compound terms. In this case, the system determines that the candidate abbreviation "broad" is a partial compound for "broadcast" because the system concatenates "broad" with "cast" to form "broadcast."

Note that if the system has positively identified a candidate synonym for the candidate abbreviation in step 716, the system can forgo examining the rest of the candidate synonyms in the list that have not been processed.

Note that the system can choose to use either or both of the techniques illustrated in FIGS. 7A and 7B while performing step 706.

In one embodiment of the present invention, if the system determines that the candidate abbreviation is not an abbreviation for the term, the system determines that the candidate abbreviation is not synonymous with the original term.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
   receiving a compound term that includes multiple constituent terms, and a candidate abbreviation for the compound term;
   pairing, with the candidate abbreviation, a constituent term, wherein the paired constituent term is one of the multiple constituent terms that make up a portion of the compound term;
   applying a similarity criterion to the paired candidate abbreviation and constituent term;
   determining that the paired candidate abbreviation and constituent term satisfy the applied similarity criterion; and
   establishing that the candidate abbreviation is not an abbreviation for the compound term, based on determining that the paired candidate abbreviation and constituent term satisfy the applied similarity criterion.

2. The computer-implemented method of claim 1, wherein determining that the paired candidate abbreviation and constituent term satisfy the applied similarity criterion comprises determining that the paired candidate abbreviation and constituent term share a lexical relationship.

3. The computer-implemented method of claim 1,
   wherein the similarity criterion is a punctuation criterion;
   wherein applying the similarity criterion to the paired candidate abbreviation and constituent term comprises:
      generating a first comparison term by removing all punctuation characters from the constituent term of the pair,
      generating a second comparison term by removing all punctuation characters from the candidate abbreviation, and
      determining a difference value by comparing the first comparison term and the second comparison term, the difference value being equal to the number of characters by which the first comparison term and the second comparison term differ; and
   wherein determining that the paired candidate abbreviation and constituent term satisfy the applied similarity criterion comprises determining that the difference value is less than or equal to a threshold value.

4. The computer-implemented method of claim 1,
   wherein the similarity criterion is a spacing criterion;
   wherein applying the similarity criterion to the paired candidate abbreviation and constituent term comprises:
      generating a first comparison term by removing all spaces from the constituent term of the pair,
      generating a second comparison term by removing all spaces from the candidate abbreviation, and
      determining a difference value by comparing the first comparison term and the second comparison term, the difference value being equal to the number of characters by which the first comparison term and the second comparison term differ; and
   wherein determining that the paired candidate abbreviation and constituent term satisfy the applied similarity criterion comprises determining that the difference value is less than or equal to a threshold value.

5. The computer-implemented method of claim 1,
wherein the similarity criterion is an edit-distance criterion;
wherein applying the similarity criterion to the paired candidate abbreviation and constituent term comprises:
determining an edit value, wherein the edit value is equal to a number of characters of the constituent term of the pair that would require editing for the constituent term of the pair and the candidate abbreviation to match; and
wherein determining that the paired candidate abbreviation and constituent term satisfy the applied similarity criterion comprises determining that the edit value is less than or equal to a threshold value.

6. The computer-implemented method of claim 1,
wherein the similarity criterion is a stemming criterion;
wherein applying the similarity criterion to the paired candidate abbreviation and constituent term comprises:
determining that the constituent term of the pair and the candidate abbreviation share a common prefix, and
based on determining that the constituent term of the pair and the candidate abbreviation share a common prefix, determining a comparison value by dividing a number of characters of the common prefix by a length of one of the constituent term of the pair and the candidate abbreviation; and
wherein determining that the paired candidate abbreviation and constituent term satisfy the applied similarity criterion comprises determining that the comparison value is greater than or equal to a threshold value.

7. The computer-implemented method of claim 1,
wherein the similarity criterion is an accent criterion;
wherein applying the similarity criterion to the paired candidate abbreviation and constituent term comprises:
generating a first comparison term by removing all accent characters from the constituent term of the pair,
generating a second comparison term by removing all accent characters from the candidate abbreviation, and
determining a difference value by comparing the first comparison term and the second comparison term, the difference value being equal to the number of characters by which the first comparison term and the second comparison term differ; and
wherein determining that the paired candidate abbreviation and constituent term satisfy the applied similarity criterion comprises determining that the difference value is less than or equal to a threshold value.

8. A system comprising:
one or more data processors; and
a memory coupled to the one or more data processors having instructions stored thereon which, when executed by the one or more data processors, cause the one or more data processors to perform operations comprising:
receiving a compound term that includes multiple constituent terms, and a candidate abbreviation for the compound term;
pairing, with the candidate abbreviation, a constituent term, wherein the paired constituent term is one of the multiple constituent terms that make up a portion of the compound term;
applying a similarity criterion to the paired candidate abbreviation and constituent term;
determining that the paired candidate abbreviation and constituent term satisfy the applied similarity criterion; and
establishing that the candidate abbreviation is not an abbreviation for the compound term, based on determining that the paired candidate abbreviation and constituent term satisfy the applied similarity criterion.

9. The system of claim 8, wherein determining that the paired candidate abbreviation and constituent term satisfy the applied similarity criterion comprises determining that the paired candidate abbreviation and constituent term share a lexical relationship.

10. The system of claim 8,
wherein the similarity criterion is a punctuation criterion;
wherein applying the similarity criterion to the paired candidate abbreviation and constituent term comprises:
generating a first comparison term by removing all punctuation characters from the constituent term of the pair,
generating a second comparison term by removing all punctuation characters from the candidate abbreviation, and
determining a difference value by comparing the first comparison term and the second comparison term, the difference value being equal to the number of characters by which the first comparison term and the second comparison term differ; and
wherein determining that the paired candidate abbreviation and constituent term satisfy the applied similarity criterion comprises determining that the difference value is less than or equal to a threshold value.

11. The system of claim 8,
wherein the similarity criterion is a spacing criterion;
wherein applying the similarity criterion to the paired candidate abbreviation and constituent term comprises:
generating a first comparison term by removing all spaces from the constituent term of the pair,
generating a second comparison term by removing all spaces from the candidate abbreviation, and
determining a difference value by comparing the first comparison term and the second comparison term, the difference value being equal to the number of characters by which the first comparison term and the second comparison term differ; and
wherein determining that the paired candidate abbreviation and constituent term satisfy the applied similarity criterion comprises determining that the difference value is less than or equal to a threshold value.

12. The system of claim 8,
wherein the similarity criterion is an edit-distance criterion;
wherein applying the similarity criterion to the paired candidate abbreviation and constituent term comprises:
determining an edit value, wherein the edit value is equal to a number of characters of the constituent term of the pair that would require editing for the constituent term of the pair and the candidate abbreviation to match; and
wherein determining that the paired candidate abbreviation and constituent term satisfy the applied similarity criterion comprises determining that the edit value is less than or equal to a threshold value.

13. The system of claim 8,
wherein the similarity criterion is a stemming criterion;
wherein applying the similarity criterion to the paired candidate abbreviation and constituent term comprises:
determining that the constituent term of the pair and the candidate abbreviation share a common prefix, and based on determining that the constituent term of the pair and the candidate abbreviation share a common prefix, determining a comparison value by dividing a number of characters of the common prefix by a length of one of the constituent term of the pair and the candidate abbreviation; and wherein determining that the paired candidate abbreviation and constituent term satisfy the applied similarity criterion comprises determining that the comparison value is greater than or equal to a threshold value.

14. The system of claim 8,
wherein the similarity criterion is an accent criterion;
wherein applying the similarity criterion to the paired candidate abbreviation and constituent term comprises:
generating a first comparison term by removing all accent characters from the constituent term of the pair,
generating a second comparison term by removing all accent characters from the candidate abbreviation, and
determining a difference value by comparing the first comparison term and the second comparison term, the difference value being equal to the number of characters by which the first comparison term and the second comparison term differ; and
wherein determining that the paired candidate abbreviation and constituent term satisfy the applied similarity criterion comprises determining that the difference value is less than or equal to a threshold value.

15. A non-transitory computer-readable medium storing software comprising instructions executable by one or more processing devices which, upon such execution, cause the one or more processing devices to perform operations comprising:
receiving a compound term that includes multiple constituent terms, and a candidate abbreviation for the compound term;
pairing, with the candidate abbreviation, a constituent term, wherein the paired constituent term is one of the multiple constituent terms that make up a portion of the compound term;
applying a similarity criterion to the paired candidate abbreviation and constituent term;
determining that the paired candidate abbreviation and constituent term satisfy the applied similarity criterion; and
establishing that the candidate abbreviation is not an abbreviation for the compound term, based on determining that the paired candidate abbreviation and constituent term satisfy the applied similarity criterion.

16. The computer-readable medium of claim 15, wherein determining that the paired candidate abbreviation and constituent term satisfy the applied similarity criterion comprises determining that the paired candidate abbreviation and constituent term share a lexical relationship.

17. The computer-readable medium of claim 15,
wherein the similarity criterion is a punctuation criterion;
wherein applying the similarity criterion to the paired candidate abbreviation and constituent term comprises:
generating a first comparison term by removing all punctuation characters from the constituent term of the pair,
generating a second comparison term by removing all punctuation characters from the candidate abbreviation, and
determining a difference value by comparing the first comparison term and the second comparison term, the difference value being equal to the number of characters by which the first comparison term and the second comparison term differ; and
wherein determining that the paired candidate abbreviation and constituent term satisfy the applied similarity criterion comprises determining that the difference value is less than or equal to a threshold value.

18. The computer-readable medium of claim 15,
wherein the similarity criterion is a spacing criterion;
wherein applying the similarity criterion to the paired candidate abbreviation and constituent term comprises:
generating a first comparison term by removing all spaces from the constituent term of the pair,
generating a second comparison term by removing all spaces from the candidate abbreviation, and
determining a difference value by comparing the first comparison term and the second comparison term, the difference value being equal to the number of characters by which the first comparison term and the second comparison term differ; and
wherein determining that the paired candidate abbreviation and constituent term satisfy the applied similarity criterion comprises determining that the difference value is less than or equal to a threshold value.

19. The computer-readable medium of claim 15,
wherein the similarity criterion is an edit-distance criterion;
wherein applying the similarity criterion to the paired candidate abbreviation and constituent term comprises:
determining an edit value, wherein the edit value is equal to a number of characters of the constituent term of the pair that would require editing for the constituent term of the pair and the candidate abbreviation to match; and
wherein determining that the paired candidate abbreviation and constituent term satisfy the applied similarity criterion comprises determining that the edit value is less than or equal to a threshold value.

20. The computer-readable medium of claim 15,
wherein the similarity criterion is a stemming criterion;
wherein applying the similarity criterion to the paired candidate abbreviation and constituent term comprises:
determining that the constituent term of the pair and the candidate abbreviation share a common prefix, and
based on determining that the constituent term of the pair and the candidate abbreviation share a common prefix, determining a comparison value by dividing a number of characters of the common prefix by a length of one of the constituent term of the pair and the candidate abbreviation; and
wherein determining that the paired candidate abbreviation and constituent term satisfy the applied similarity criterion comprises determining that the comparison value is greater than or equal to a threshold value.

21. The computer-readable medium of claim 15,
wherein the similarity criterion is an accent criterion;
wherein applying the similarity criterion to the paired candidate abbreviation and constituent term comprises:
generating a first comparison term by removing all accent characters from the constituent term of the pair,
generating a second comparison term by removing all accent characters from the candidate abbreviation, and
determining a difference value by comparing the first comparison term and the second comparison term, the difference value being equal to the number of characters by which the first comparison term and the second comparison term differ; and wherein determining that the paired candidate abbreviation and constituent term satisfy the applied similarity criterion comprises determining that the difference value is less than or equal to a threshold value.

* * * * *